Patented Jan. 25, 1944

2,340,109

UNITED STATES PATENT OFFICE 2,340,109

COPOLYMER OF DIVINYL BENZENE POLYMERS AND UNSATURATED ALKYD RESINS

Gaetano F. D'Alelio, Pittsfield, Mass., assignor to General Electric Company, a corporation of New York No Drawing. Application June 23, 1942,
Serial No. 448,161

7 Claims. (Cl. 260—42)

This invention relates to the production of new materials having valuable and characteristic properties that make them especially suitable for use in industry, for example, in molding, laminating, casting, coating and adhesive applications and for other purposes. This invention is concerned more particularly with compositions of matter comprising an interpolymer (copolymer) or interpolymers of at least one modified or unmodified polyhydric alcohol ester of an unsaturated polycarboxylic acid (hereinafter for brevity designated generally as an "unsaturated alkyd resin") and at least one other component consisting of a soluble, fusible, heat-convertible polymer of divinyl benzene, the preparation of which is disclosed in my copending applications Serial Nos. 448,155, 448,156, 448,157, 448,158, and 448,159, filed concurrently herewith and assigned to the same assignee as the present invention.

The soluble, fusible, heat-convertible polymers of divinyl benzene used in carrying the present invention into effect are in themselves unsatisfactory polymerizing bodies. The heat-converted polymer is excessively brittle, relatively non-adhering, and is far too easily fractured to be of any use in commercial problems. Likewise, the unsaturated alkyd resins alone are unsuited, even in the presence of polymerization catalysts, for the preparation of practical useful bodies. With or without polymerization catalysts, however, they may be applied in film form and, under the influence of heat or light or heat and light, may be converted in a reasonable time to a cured film. But if effort be made to prepare commercially useful massive bodies from the unsaturated alkyds alone, heat treatment, even for 24 hours in the presence of a polymerization catalyst, usually gives unsuitable materials, that is, they generally lack the properties required for the usual service applications. For example, the cast or molded articles are often soft, rubbery masses (even after heat treatment for 24 hours at elevated temperatures) or, if hard bodies, frequently are filled with bubbles or show cracks or both when cured.

It was, therefore, quite surprising and unexpected to find that by copolymerizing a soluble, fusible heat-convertible polymer of divinyl benzene with an unsaturated alkyd resin interpolymers were obtained having properties quite different from the properties of the individual components when polymerized under the same conditions. The properties of the interpolymers range from hard, tough, insoluble and infusible bodies both in film form and when cast or molded in large size, to softer, flexible bodies. In general, the properties of these new products are such as to render them suitable for a wide variety of technical applications.

In carrying the present invention into effect a polymerizable esterification product of a polyhydric alcohol and an unsaturated polycarboxylic acid is first prepared in accordance with technique well known to those skilled in the alkyd resin art. I may also use an unsaturated polyhydric alcohol, e. g., 1,4-dihydroxy butene-2 with a saturated or unsaturated polycarboxylic acid or mixture thereof in preparing the unsaturated alkyd resins. Any polyhydric alcohol containing at least two esterifiable aliphatic hydroxyl groups or mixtures of such alcohols may be used in preparing the unsaturated alkyd resin. Examples of such polyhydric alcohols are ethylene glycol, di-, tri- and tetra-ethylene glycols, propylene glycol, trimethylene glycol, glycerine, pentaerythritol, 1,4-dihydroxy butene-2, etc. Examples of polycarboxylic acids are: maleic acid, fumaric acid, citraconic acid, mesaconic acid, acetylene dicarboxylic acid, aconitic, itaconic, gammamethyl itaconic acid, gammaethyl itaconic acid, gamma-n-propyl itaconic acid, gammaisopropyl itaconic acid, gamma-isobutyl itaconic acid, gamma-n-hexylitaconic acid, teraconic acid, alpha-ethyl itaconic acid, gamma-dimethyl citraconic acid, pyrocinchonic acid, glutaconic acid, muconic acid, glutinic acid, including their homologues and derivatives, e. g., halogen derivatives (dibromomaleic acid, chloroitaconic acids, etc.).

The terms "polycarboxylic acid" and "dicarboxylic acid" as used generally herein and in the appended claims with reference to the unsaturated or saturated polycarboxylic acids are intended to include within their meaning the anhydrides of such acids.

In some cases, instead of using an unmodified unsaturated alkyd resin I may use a polymerizable unsaturated alkyd resin which has been internally modified by replacing a part, say up to about 75 mol per cent, of the unsaturated polycarboxylic acid with a non-ethylenic polycarboxylic acid, for example, a saturated aliphatic polycarboxylic acid, such as succinic, adipic, glutaric, pimelic, sebacic, azelaic, suberic, tricarballylic, etc., a cycloaliphatic or an aromatic polycarboxylic acid, e. g., cyclopropane dicarboxylic, cyclohexane dicarboxylic, phthalic, benzoyl phthalic, terephthalic, isophthalic, etc., or as previously defined within their meaning, the anhydrides of such acids.

The term "unsaturated alkyd resin" as used herein and in the appended claims is intended to include within its meaning both unmodified esterification products of a polyhydric alcohol with an unsaturated polycarboxylic acid and polymerizable esterification products of the said components which have been modified, for example, as above briefly described.

To achieve copolymerization of the unsaturated alkyd resin with the soluble, fusible, heat-convertible polymer of divinyl benzene, a solution of the said polymer and the said ester is preferably first effected in a mutual solvent having within its structure a polymerizable ethylenic linkage if a casting or molding resin is desired or in any mutual solvent, e. g., benzene, ethyl acetate, dioxane, styrene, etc., when an impregnating or coating resin is desired. The solvent may also act as the carrier for a small amount of polymerization catalyst. Examples of polymerization catalysts which may be used are: ozone, ozonides, inorganic super oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, p-chlorobenzoyl peroxide, etc., mixed organic peroxides, e. g., acetyl benzoyl peroxide, ketone peroxides, e. g., acetone peroxide, triacetone peroxide, alkyl derivatives of hydrogen peroxide, e. g., ethyl hydrogen peroxide, diethyl peroxide, etc., various per compounds such as perborates, persulfates, perchlorates, etc., aluminum salts such as the halides, e. g., aluminum chloride, organic and inorganic acids such as methacrylic, hydrofluoric, etc., metal compounds of the unsaturated acids as, for instance, cobalt and manganese resinates, linoleates, maleates, etc., hydrogen peroxide, etc. However, benzoyl peroxide is a preferred catalyst. Any suitable amount of catalyst may be used, but, in general, the catalyst concentration will be within the range of 0.1 to 2.0 per cent by weight of the whole.

When rapidity of interpolymerization between the poly-ester and the soluble, fusible, heat-convertible polymer of divinyl benzene with or without a third component is of secondary importance, copolymerization between these components may be effected merely under the influence of heat, light or heat and light and in the absence of an accelerator of polymerization. The rate of copolymerization and the properties of the final product vary with the time, temperature and, if a catalyst is used, also with the catalyst concentration. Copolymerization may be effected at from room temperature (20–30° C.) to temperatures above 100° C., for example 130° C., but ordinarily I use slowly increasing temperatures to a maximum of 60–120° C. in causing the mixed components to interpolymerize.

In order that those skilled in the art may better understand how the present invention may be carried into effect, the following examples are given by way of illustration. All parts are by weight.

*Example 1*

An alkyd was prepared in the usual manner using 1 mol of maleic anhydride and 1 mol of diethylene glycol. The following solutions were made up.

|  | Parts | | | |
| --- | --- | --- | --- | --- |
|  | A | B | C | D |
| Unsaturated alkyd resin | 190 | 90 | 30 | 20 |
| Soluble, fusible, heat-convertible polymer of divinyl benzene | 10 | 10 | 10 | 20 |
| Benzene | 200 | 100 | 100 | 100 |
| Benzoyl peroxide | 1 | 1 | 1 | 1 |

After complete solution had taken place in the above formulations a portion of each solution was placed in contact with a glass plate and the solvent allowed to evaporate. The films were heated at 50° C. and then at 110° C., yielding a hard, insoluble and infusible resin surface. Each of the above varnishes was used to impregnate strips of cloth wound as insulating tape. The impregnated strips were each baked overnight at 110° C., yielding a firmly bonded, hard, insulating tape.

*Example 2*

An alkyd resin was prepared by dehydrating a reaction mixture of:

| | Mols |
| --- | --- |
| Diethylene glycol | 3 |
| Maleic anhydride | 2 |
| Phthalic anhydride | 1 |

The following solutions were made up:

|  | Parts | | | |
| --- | --- | --- | --- | --- |
|  | A | B | C | D |
| Unsaturated alkyd resin | 190 | 90 | 30 | 20 |
| Soluble, fusible, heat-convertible polymer of divinyl benzene | 10 | 10 | 10 | 20 |
| Benzene |  | 100 | 100 | 100 |
| Ethyl acetate | 200 |  |  |  |
| Benzoyl peroxide | 1 | 1 | 1 | 1 |

After complete solution had taken place in the above formulations a portion of each solution was placed in contact with a glass plate and the solvent allowed to evaporate. The films were heated at 50° C. and then at 110° C., yielding a hard, insoluble and infusible resin surface. Each of the above varnishes was used to impregnate strips of cloths overnight at 110° C., yielding a firmly bonded, hard, insulating tape.

*Example 3*

A 20% solution of the soluble, fusible, heat-convertible polymer of divinyl benzene was prepared in styrene. Fifty parts of this solution were thoroughly mixed with 50 parts of the alkyd prepared from diethylene glycol and maleic anhydride. The mixture was placed in a vial.

A similar solution was prepared by mixing 25 parts of the polymer solution in styrene with 75 parts of alkyd. This resin mixture was also placed in a vial. 0.5 part benzoyl peroxide was added to each. The solutions were baked at 50° C. overnight and then at 110° C. for 24 hours. The castings formed in this manner were extremely hard, slightly opaque and very solvent resistant.

In the preceding examples instead of using diethylene glycol maleate and the esterification product of diethylene glycol, maleic anhydride and phthalic anhydride, I may use other alkyd resins prepared in a similar fashion from compounds previously indicated. For example, I may use glyceryl itaconate, glyceryl maleate, ethylene glycol maleate, ethylene glycol itaconate, esterification products of ethylene glycol, itaconic acid, phthalic anhydride; diethylene glycol, itaconic acid and succinic acid; ethylene glycol, maleic anhydride and succinic acid; diethylene glycol, aconitic acid, sebacic acid; triethylene glycol, mesaconic acid, phthalic anhydride; pentaerythritol, maleic anhydride, adipic acid; glycerine, fumaric acid; glycerine, maleic anhydride, glutaric acid; glycerine, acetylene dicarboxylic acid, phthalic anhydride; tetra-ethylene glycol, gamma-methyl itaconic acid, citraconic acid; pentaerythritol, mesaconic acid, phthalic anhydride, etc.

Polymerization catalysts other than benzoyl peroxide may be employed, for instance accelerators of polymerization, such as hereinbefore mentioned.

As the third component in the polymerizable mass I may use in lieu of styrene, specifically illustrated in Example 3, any of the following polymerizable compounds having a

grouping: esters of acrylic acid, e. g., methyl acrylate, methyl methacrylate, ethyl acrylate, ethyl methacrylate, methyl chloroacrylate, propyl acrylate, isopropyl acrylate, butyl acrylate, isobutyl acrylate, isobutyl methacrylate, bromo-isobutyl acrylate, phenyl acrylate, fluorophenyl acrylate, benzyl acrylate, benzyl methacrylate, ethyl chloroacrylate, etc., aryl ethylenes, e. g., methyl styrene, tolyl ethylene, bromotolyl ethylene, etc., vinyl esters, e. g., vinyl acetate, vinyl propionate, vinyl butyrate, vinyl isobutyrate, vinyl valerate, vinyl cyclopentanoate, vinyl cyclohexanoate, vinyl benzoate, vinyl methylbenzoate, etc., nitrile derivatives of acrylic acid, e. g., acrylonitrile, methacrylonitrile, etc., malonic acids and esters of malonic acids, e. g., methylene malonic acid, monomethyl ester, monoethyl ester, monopropyl ester, monobutyl ester, dimethylester, diethyl ester, dipropyl ester, monophenyl ester, diphenyl ester, etc., and homologues of the above radicals and their related compounds, allyl acrylate, methallyl acrylate, allyl methacrylate, methallyl methacrylate, allyl ethacrylate, chlorallyl acrylate, chlorallyl chloracrylate, etc., unsaturated alcohol poly-esters of saturated aliphatic and aromatic polycarboxylic acids (e. g., diallyl phthalate, diallyl oxalate, dimethallyl oxalate, diallyl succinate, dimethallyl tartrate, diallyl terephthalate, etc.), ethers (e. g., divinyl ether, diallyl ether, vinyl allyl ether, dimethallyl ether, etc.), ketones (e. g., divinyl ketone, diallyl ketone, dimethallyl ketone, etc.). Additional examples are disclosed in my U. S. Patent 2,260,005, dated October 21, 1941.

The interpolymerization products of this invention have a wide range of properties. Depending, for example, upon the particular alkyd resin selected as the copolymerizing material, the particular conditions of polymerization and the extent of the interpolymerization, they vary from soft, flexible, soluble bodies to hard, rigid masses of varying resistance to solvents. In intermediate stages of copolymerization some form fluid compositions of varying intrinsic viscosities and may be so used. Others form gels. For coating and impregnating applications where the presence of a small amount of solvent in the cured composition is not objectionable, the mixed starting components may be diluted with volatile or non-volatile solvents to viscosities best adapted to meet the particular service application and then may be copolymerized after application of the solution to the particular article to be coated or impregnated. By suitable selection of the starting materials and the conditions of interpolymerization, interpolymers can be obtained in an insoluble, infusible state practically resistant to the destructive effect of other chemical bodies such as acids, bases, solvents and the like.

These new interpolymers may be used alone or with fillers or other modifying agents, for example, in casting, molding and laminating applications as adhesives, impregnants for many porous bodies such as cork, pottery, felts or fabricated bodies with interstices, e. g., the windings of electrical coils, netted fiber, interwoven fibrous materials, etc. They also may be used for protectively coating impervious articles such as paper, wood, cloth, glass fibers, concrete, synthetic boards, etc. They also may be employed in the production of wire enamels and winding tapes. The mixed components or partial interpolymers thereof, with or without modifying agents, may be cast and molded under heat or under heat and pressure. They also may be molded by injection, extrusion or compression molding technique whereby they are heat- and pressure-hardened to yield molded articles of manufacture for various industrial, household and novelty uses.

What I claim as new and desire to secure by Letters Patent of the United States is:

1. A composition comprising the product of copolymerization of a mass comprising a soluble, fusible, heat-hardenable polymer of divinyl benzene and an unsaturated alkyd resin.

2. A composition comprising a copolymer of a soluble, fusible, heat-hardenable polymer of divinyl benzene and an alkyd resin produced from a mixture containing a polyhydric alcohol and an unsaturated organic polybasic acid.

3. The product of reaction under heat in the presence of a polymerization catalyst of a soluble, fusible, heat-hardenable polymer of divinyl benzene, an unsaturated alkyd resin and a polymerizable organic compound having a

grouping.

4. A copolymer of (1) a fusible, soluble, heat-hardenable polymer of divinyl benzene, (2) an unsaturated alkyd resin and (3) styrene.

5. The process which comprises reacting under heat and in the presence of a polymerization catalyst a mass comprising a soluble, fusible, heat-hardenable polymer of divinyl benzene and an unsaturated alkyd resin until a copolymer is obtained capable of being converted to an infusible, insoluble state.

6. A copolymer of (1) a fusible, soluble, heat-hardenable polymer of divinyl benzene, (2) an unsaturated alkyd resin and (3) an ester of an acrylic acid.

7. A copolymer of (1) a fusible, soluble, heat-hardenable polymer of divinyl benzene, (2) an unsaturated alkyd resin and (3) a vinyl ester.

GAETANO F. D'ALELIO.